June 6, 1944.  G. SMITH  2,350,539
AUTOMATIC TEMPERATURE CONTROL FOR INJECTION MOLDING MACHINES
Filed March 14, 1940  2 Sheets-Sheet 1

Inventor
Graydon Smith
By Owen W. Kennedy
Attorney

June 6, 1944.    G. SMITH    2,350,539
AUTOMATIC TEMPERATURE CONTROL FOR INJECTION MOLDING MACHINES
Filed March 14, 1940    2 Sheets-Sheet 2

Inventor:
Graydon Smith
By Owen W. Kennedy
Attorney

Patented June 6, 1944

2,350,539

UNITED STATES PATENT OFFICE 2,350,539

AUTOMATIC TEMPERATURE CONTROL FOR INJECTION MOLDING MACHINES

Graydon Smith, Cambridge, Mass., assignor to Reed-Prentice Corporation, Worcester, Mass., a corporation of Massachusetts Application March 14, 1940, Serial No. 323,871

8 Claims. (Cl. 18—30)

The present invention relates to injection molding machines, particularly those employing material which is first rendered plastic by the application of heat, and is then injected into cooperating dies under pressure.

Injection molding machines of the above indicated character normally operate in accordance with a uniform cycle involving the feeding, plasticizing and injection of predetermined amounts of thermoplastic or thermosetting materials for each complete cycle. Since material of this character usually exhibits a relatively narrow temperature range in which it has the desired flow or setting characteristics, it has heretofore been proposed to obtain heating of the material at a constant temperature, such as to insure the ready flow of the same through the heating apparatus and its injection into the dies at a temperature best suited for the molding operation. However, difficulties have arisen whenever the timing of the normal operating cycle of the machine is upset for any reason, due to the fact that the degree of heat purposely maintained for a given material may well become such as to cause burning or premature setting of the material, should the operating cycle be slowed down appreciably, or to cause incomplete plasticization should the operating cycle be speeded up.

The object of the present invention is to provide an improved automatic temperature control apparatus for injection molding machines, functioning in such a manner as to effectively prevent overheating or underheating of the material being plasticized, in the event of any occurrence tending to upset the timing of the normal cycle of operation of the machine. Briefly stated, the invention contemplates the utilization of control apparatus directly responsive to successive operations of the machine, whereby any slowing down or speeding up of the normal operating cycle will be automatically followed by a lowering or raising of the temperature to which the material is subjected in the plasticizing zone, until such time as the normal operating cycle is resumed.

The above and other advantageous features of the invention will hereinafter more fully appear from the following description, considered in connection with the accompanying drawings, in which.

Figure 1:
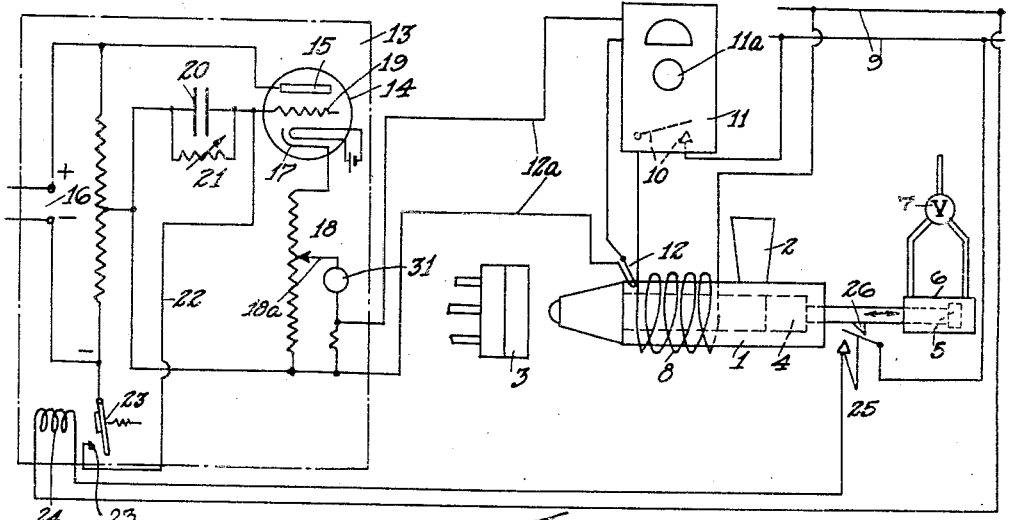
Fig. 1 is a diagrammatic view, illustrating the control apparatus as applied to an injection molding machine.

Referring to Fig. 1, a portion of an injection molding machine is shown diagrammatically as comprising a heating and injection cylinder 1, to which suitable heat plasticizable material is fed from a hopper 2 for injection into suitable dies 3, under the pressure developed within the cylinder 1 by a plunger 4. Reciprocatory movement is adapted to be imparted to the injection plunger 4 by means of a piston 5 operating in a cylinder 6, with suitable fluid pressure controlled means 7, indicated as a valve device, being provided to cause successive reciprocations of the injection plunger 4, in accordance with a predetermined timing.

Material fed to the cylinder 1 is adapted to be plasticized therein by the heat generated through energization of a coil 8 from a suitable source of electrical energy represented by the supply mains 9. One terminal of the coil 8 is connected to one supply main 9, while the other terminal thereof is adapted to be intermittently connected to the other supply main through relatively movable contacts 10, forming part of a potentiometer controller 11. The injection cylinder 1 also provides a thermocouple 12, the terminals of which are connected by conductors 12a to the potentiometer 11, as well as to a control panel 13, the function of which will hereinafter appear.

The potentiometer 11 is of any well known type commercially available, and need not be described in detail herein, other than to state that the potentiometer is adapted to control, through its contacts 10, the connection or disconnection of the coil 8 to the mains 9. Such control is normally dependent upon the functioning of the potentiometer 11, in response to voltage generated by the thermocouple 12, when the temperature within the injection cylinder reaches a predetermined degree, the net result being that the coil 8 is energized and deenergized at intervals to maintain a constant temperature within the injection cylinder 1, best suited for the plasticization and injection of the particular material being utilized by the machine.

The parts of the injection molding machine described thus far form no part of the present invention per se, and are more fully shown and described in my co-pending application, Serial No. 259,404, filed jointly with Edward S. Bird and Leon F. Marsh, on March 2, 1939. It is to be understood that the arrangement and functioning of the machine parts described above are merely illustrative of the manner in which an injection molding machine may be operated, while maintaining the injection cylinder at a constant temperature, and that the invention about to be described may be applied to other types of injection molding machines equipped with other types of heating devices and temperature control.

In normal operation of the machine described above, the potentiometer 11 is given a setting, by means of the control knob 11a such, for example, as will maintain the injection cylinder 1 at a temperature of approximately 400°. This particular temperature is chosen to meet the thermal characteristics of the material being molded, and is also chosen on the assumption that the machine will operate with a uniform cycle, such as will insure, for example, 60-second intervals between injection shots. Therefore, the normal and expected functioning of the thermocouple 12 in conjunction with its potentiometer 11, is such as to insure that the coil 8 for generating the heat will be disconnected while the temperature within the cylinder 1 remains substantially at 400°.

Let it now be assumed that after the machine has been operating over an appreciable period with a given timing and potentiometer setting, such as indicated above, something happens to upset the timing of the operating cycle. This might readily occur, should the machine operator purposely increase the intervals between injection shots to make adjustments in the dies, or perform some other operation not contemplated when the potentiometer 10 was originally set to maintain a 400° temperature within the cylinder 1, on the basis of a 60-second operating cycle. When such an increase in the length of the operating cycle occurs, such as might extend the average interval between shots to 90 seconds, it is evident that the thermocouple 12 and the potentiometer 11 will continue to function as before, to maintain a constant temperature of 400°, within the heating cylinder. Moreover, should the increased time interval between shots be sustained for any considerable number of cycles, it is evident that the material within the cylinder 1 will become over-plasticized and possibly burned, or even set, in cases where a thermosetting material is being handled, due to the material being subjected to a predetermined temperature for longer periods than was originally contemplated, when the potentiometer 11 was set.

In order to prevent such over-heating, or setting, of the material being handled, the present invention contemplates the provision of an automatic temperature control means to bring about a reduction of the temperature within the cylinder 1 immediately upon the occurrence of any appreciable increase in the time interval between successive injection shots of the plasticized material. To this end, the previously mentioned control panel 13 provides a vacuum tube 14, shown as being of the three-electrode thermionic valve type. The anode 15 of this tube 14 is connected to a suitable direct current voltage source 16, while the cathode 17 is connected in circuit with a resistor 18, variable portions of which may be included in circuit with the thermocouple 12, through the conductors 12a.

The grid 19 of the tube 14 is connected to a condenser 20, having a variable resistor 21 connected across its terminals. A conductor 22 leading from a point between the grid 19 and one condenser terminal, is adapted to charge the condenser 20 from the negative side of the source 16 through closure of the contacts 23 of a relay, which contacts are normally open. The winding 24 of this relay has one terminal connected to one supply main 9, while its other terminal is connected to one of a pair of relatively movable contacts 25 of a timing device. The other contact of this device is connected to the other supply main 9, and normally separated from the first contact. The timing device is of any suitable character, and as shown herein, consists of an actuator or cam element 26, movable with the piston rod 5a, so that the contacts 25 are momentarily closed as the injection plunger 4 nears the end of its injection stroke, to force plasticized material from the cylinder 1 into the dies 3.

Closure of the contacts 25 of the timing device will energize the relay winding to bring about a momentary closure of the contacts 23, thereby imparting a negative charge to the grid condenser 20, after which the contacts 23 open. As long as the condenser 20 retains an appreciable negative charge, current flowing through the tube 14 to the anode 15 will be negligible, and will approach zero, although the negative condenser charge will tend to leak away through the variable resistor 21, at a rate determined by the setting of this resistor.

Let it now be assumed that the machine, with a given potentiometer setting of, say, 400° for the injection cylinder 1, is operating with a selected time interval of 60 seconds between shots. As the injection plunger 4 moves back and forth, it is evident that once during each cycle, as the plunger 4 nears the end of its injection stroke, the grid condenser 20 will receive a negative charge, as a result of the momentary closure of relay contacts 23. The capacity of the condenser 20 and the setting of the grid resistor 21 are such that when the machine is operating normally on a fixed cycle, with regular intervals between injection shots, the condenser 20 is charged frequently enough to maintain sufficient negative bias on the grid 19 to reduce the anode current substantially to zero. Therefore, the voltage impressed on the potentiometer 11 remains substantially that generated by the thermocouple 12, and the temperature within the injection cylinder 1 remains substantially constant, in accordance with the setting of the potentiometer. In other words, as long as the timing of the cycle remains uniform, that portion of the resistor 18 included in the potentiometer circuit, has no appreciable influence on temperature control.

However, should the timing of the machine be slowed down for any reason, so that the intervals between injection shots are increased, as from 60 seconds to 90 seconds, it is obvious that the grid condenser 20 will receive successive charges at much longer intervals than before. Consequently, the negative current charge will have time to leak away to such an extent as to cause an immediate increase in the current flowing to the anode 15. As a result of this current flowing through a portion of the resistor 18, a voltage will be imposed upon the potentiometer in addition to the voltage of the thermocouple 12, and current will be cut off from the heating coil 8 when this voltage reaches that particular value at which the thermocouple voltage has heretofore been effective. The net result of the above described functioning of the tube 14 is that even with a potentiometer setting of 400°, the injection cylinder 1 will be actually maintained at a temperature appreciably less than 400°, thereby preventing over-plasticizing and burning of the material, or setting of the material within the cylinder, when employing material of the thermosetting type.

Should the normal timing for the operating cycle of the machine be resumed, the decreased intervals between successive charges on the condenser 20 will quickly lessen its previous rate of discharge, so that the negative bias on the grid 19 will again be sufficient to restrict the flow of current to the anode 15, to such a low value that the functioning of the potentiometer 11 will not be affected by conditions in the tube circuit.

Figure 2:
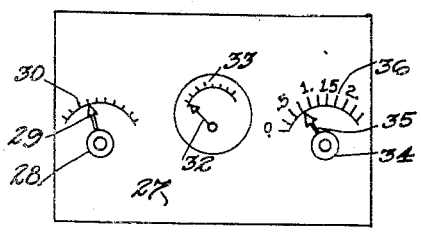
Fig. 2 is a view in front elevation, showing the external appearance of a control box containing the apparatus of Fig. 1.

Referring now to Fig. 2, there is shown the external appearance of a control box containing the apparatus, previously described as being mounted on the control panel 13. The front 27 of the control box provides a turnable knob 28 for operating the movable arm 18a of the variable resistor 18 and a pointer 29 carried by the knob 28 cooperates with a series of scale markings 30 calibrated to indicate the temperature that will be maintained in the heating cylinder 1 for any given setting of the resistor 18. That is to say, the scale markings 30 will be in inverse ratio to the portions of the resistor 18 that are included in circuit with the thermocouple, so that with a potentiometer setting for 400°, for example, a setting of the pointer 29 at 300° will indicate the maximum temperature reduction that will be effected through functioning of the tube 14, should the operating cycle be interrupted completely.

In order to indicate the actual temperature drop that is effective at any given moment during the functioning of the control apparatus, a milliameter 31 is connected in circuit with the resistor 18, and the movable pointer 32 of this instrument is visible from the front of the control box, as indicated. The pointer 32 cooperates with scale markings 33, calibrated directly in terms of temperature drop. Since the current flowing through the milliameter 31 is a direct measure of the voltage drop across that portion of the resistor 18 included in circuit with the thermocouple 12, it follows that the pointer 32 will indicate the actual reduction in temperature that is effective at any time.

As previously indicated, the resistor 21 through which the condenser 20 discharges is variable, and a knob 34 controlling this resistor provides a pointer 35 cooperating with scale markings 36, calibrated in terms of time delay. Since the setting of the resistor 21 controls the rate of discharge of the condenser 20, the scale markings 36 are in direct proportion to the amount of the resistor 21 that is connected across the terminals of the condenser 20 for any given setting of the knob 35. For example, with the knob 34 set to include only a small portion of the resistor 21 in circuit, the rate of discharge of the condenser 20 will be at a maximum, and the pointer 35 will indicate that the tube 14 will function to pass current sufficient to lower the temperature of the heating cylinder 1, upon the occurrence of a relatively slight delay in the timing of the operating cycle, such as ¼ of a minute. With the entire resistor 21 connected across the condenser terminals, the rate of discharge can be so reduced as to require a delay of as much as three or five minutes before the tube 14 became effective, as indicated by the scale markings 36.

The specific figures given above with reference to the scale markings 30 and 36, for given settings of the variable resistors 18 and 21, are purely illustrative of the manner in which the control apparatus embodying the present invention can be utilized to meet specific temperature requirements of the material being handled. Obviously, there will be a very wide range of temperature requirements, each requiring a different setting of the control knobs 28 and 34, when handling thermoplastic materials having different temperature ranges. Furthermore, the amount of regulation required will depend a great deal on the length of the operating cycle for any given material, and it has been found that the resistors 18 and 21 can be set to meet any operating condition, both as regards temperature range and duration of cycle.

While the specific figures given above are illustrative of the manner in which the temperature is automatically reduced upon slowing down of the operating cycle, the apparatus is equally capable of being initially set so as to automatically bring about an increase of temperature should the operating cycle be speeded up and thereby increase the rate at which the material is used. For example, let it be assumed that the discharging resistor 21 for the condenser 20 is initially set at such a low value that even with a normal operating cycle of 60 seconds, the grid charge will leak off so rapidly that the tube will normally pass some current. Therefore, there will be a more or less constant voltage impressed on the potentiometer in addition to the voltage of the thermocouple 12, so that the temperature which is automatically maintained, say with a setting of 400°, is a function of the combined voltages so long as the timing of the operating cycle of the machine remains constant.

If it now be assumed that the operating cycle of the machine is speeded up, so as to reduce the intervals between injection shots from 60 seconds to 45 seconds, for example, then the condenser will be charged more frequently. When this occurs, the intervals during which the negative grid charges can leak off, become so short as to maintain sufficient negative bias on the grid, to reduce the anode current substantially to zero. When this occurs, the voltage impressed on the potentiometer, becomes substantially that generated by the thermocouple 12 alone, so that an increased temperature of as high as 450°–500° will be automatically maintained within the injection cylinder, with a potentiometer setting of 400°. This temperature rise thus compensates for the increased rate of use of the plasticized material as a result of the speeding up in the operation of the machine.

When utilizing the apparatus to automatically bring about either a decrease or increase in the temperature of the heating cylinder, it is only necessary to calibrate the temperature indicator of the potentiometer 11, so that any given setting thereof presupposes the passage of sufficient current by the tube 14, to maintain an initial potential in the potentiometer circuit, in addition to that of the thermocouple. Obviously, with such a calibration, it follows that the temperature of the heating cylinder will be automatically raised or lowered from any given setting, in response to a speeding up or slowing down of the operating cycle.

Figure 3:
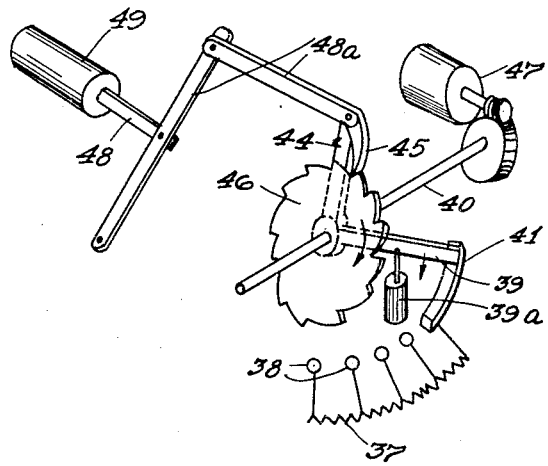
Fig. 3 is a fragmentary view, illustrating a modification of the control apparatus.
Figure 4:
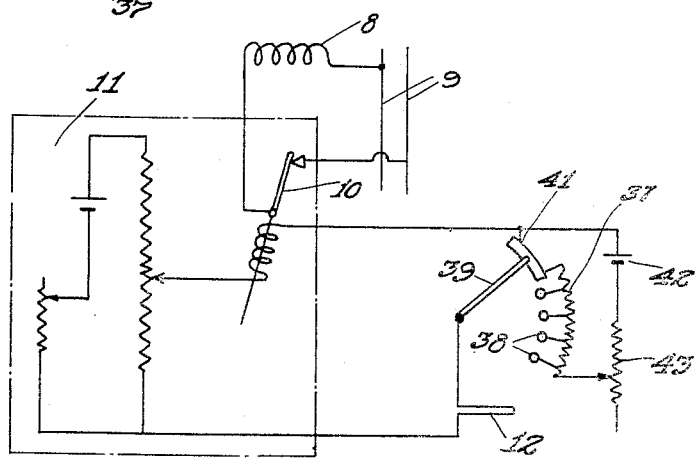
Fig. 4 is a wiring diagram illustrating the functioning of the apparatus shown in Fig. 4.

Referring now to Figs. 3 and 4, there is shown diagrammatically a modified arrangement for obtaining the automatic temperature compensation, previously described. In this modified arrangement, a control resistor 37 provides a number of taps 38, that are adapted to be engaged by an arm 39 freely mounted on a shaft 40. The arm 39 is also adapted to engage an arcuate conducting segment 41, and the resistor 37 and the segment 41 are included in a circuit energized from a source 42, with the amount of current flowing through the resistor 37 being under the control of a variable resistor 43.

The contact arm 39 is included in one side of the potentiometer circuit in series with the thermocouple 12, but with the arm 39 engaging the segment 41, the amount of current that may be flowing through the resistor 37 has no effect on the potentiometer circuit. However, should the arm 39 be turned to engage one of the taps 38, a voltage will be impressed on one side of the potentiometer circuit in addition to the voltage generated by the thermocouple 12. This added voltage will depend on what portion of the resistor 37 is included between a given tap 38 and the segment 41, and the amount of current that is flowing through the controlling resistor 37 in accordance with the setting of the variable resistor 43.

The contact arm 39 tends to turn on shaft 40 under the pull of weight 39a, and provides an extension 44 carrying a restraining pawl 45 adapted to engage the teeth of a ratchet wheel 46 mounted to turn with the shaft 40. The shaft 40 is adapted to be rotatably driven at a constant predetermined speed, by any suitable means, such as an electric motor 47, so that turning of the ratchet wheel 46 with the shaft 40 will permit the pawl 45 to follow the wheel and thereby control turning movement of the arm 39 under the pull of the weight 39a. Such turning movement of the arm 39, if permitted to continue, will result in the arm 39 leaving the segment 41 and successively engaging the taps 38 so as to impress increments of voltage on one side of the potentiometer circuit, in addition to the voltage generated by the thermocouple 12. The pawl 45, however, is adapted to be moved at intervals in a direction opposite to the movement of the teeth on the ratchet wheel 46, by means of a plunger 48 connected to the extension 44, through suitable linkage 48a, with the plunger 48 being under the control of a solenoid 49 that is adapted to be energized at intervals by the contacts 25 of the timing device shown in Fig. 1.

Assuming that the parts occupy the position of Fig. 3 at the start of a molding cycle, such as has been previously described, the pawl 45 will be free to follow the ratchet wheel 46 as the shaft 40 turns, thereby permitting the arm 39 to move along the segment 41. Should the timing of the operating cycle of the injection molding machine be such that the solenoid 49 will be energized before the arm 39 leaves the segment 41 and engages the first tap 38, then it is apparent that the controlling resistor 37 will have no effect on the potentiometer circuit and the thermocouple 12 will function to automatically maintain the material being plasticized at the particular temperature determined by the initial setting of the potentiometer.

If, however, the operating cycle of the machine be changed, so as to increase the length of the intervals between successive shots of plasticized material, then the arm 39 will be permitted to follow the movement of the ratchet wheel to such an extent that the arm will engage one or more of the taps 38 of the controlling resistor 37, before the next energization of the solenoid 49 returns the arm to its initial position in engagement with the upper end of the segment 41. When this occurs, a voltage is impressed on the potentiometer circuit, in addition to the voltage then generated by the thermocouple 12, which results in automatically deenergizing the heating coil 8 sooner than would have otherwise occurred, to thereby decrease the temperature to which the material is subjected.

Should the operating cycle of the machine be initially set, so that the arm 39 is permitted to engage one or more taps 38 before the pawl is retracted by energization of the solenoid 49, then a predetermined voltage will be impressed on the potentiometer circuit, in addition to the thermocouple voltage during each cycle. Then should the machine be speeded up so as to decrease the time intervals between shots, the more frequent energizations of the solenoid 49 will prevent the arm 39 from engaging a tap 38, with a resulting decrease in the voltage in the potentiometer circuit, and an increase in the temperature to which the material is subjected.

Figure 5:
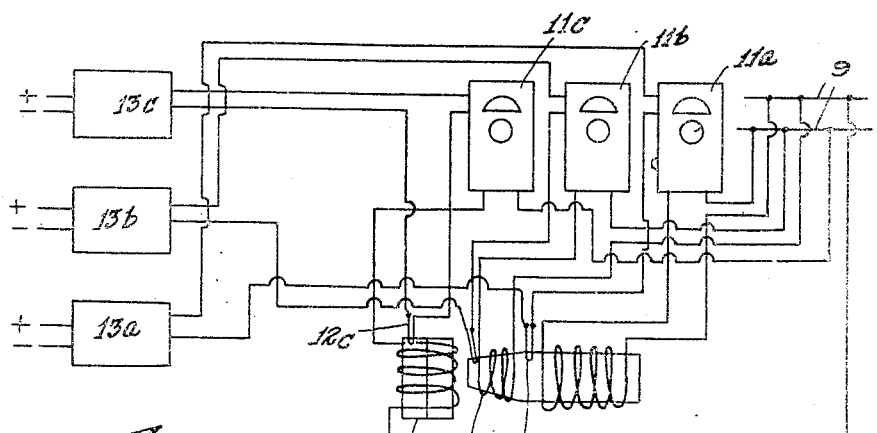
Fig. 5 is a schematic view, illustrating the invention as applied to multiple temperature control at different parts of a machine.

Referring now to Fig. 5, there is shown, diagrammatically, the further application of the invention to automatically control the temperature at different portions of the heating cylinder 1: In this arrangement, separate potentiometers 11a and 11b are employed to uniformly maintain different temperatures in the body and nose portions of the cylinder 1, under the control of separate thermocouples 12a and 12b. Therefore, separate control panels 13a and 13b are employed, with each panel connected in circuit with the corresponding thermocouple 12a or 12b. With the potentiometers 11a and 11b set to maintain a fixed temperature differential between the body and nose portion of the cylinder 1, it is evident that the apparatus on the separate control panels 13a and 13b will function independently, as described above with reference to Fig. 1, to automatically bring about the desired temperature reduction, upon a change in the timing of the operating cycle, in proportion to the initial temperature differential that may exist between different parts of the the heating cylinder. If desired, a third potentiometer 11c can be employed with electrically heated dies 3a, in co-operation with a thermocouple 12c and control panel 13c to reduce the die temperature when employing a thermosetting material.

From the foregoing, it is apparent that by the present invention there is provided an improved automatic temperature control for injection molding machines, functioning in such manner as to effectively prevent overheating and premature setting of the material being plasticized, or underheating of the material, in the event of any occurrence tending to upset the timing of the normal operating cycle of the machine. Stated another way, the apparatus of the present invention provides means for automatically controlling the degree of heat to which the material is subjected, directly in accordance with the rate of use of the plasticized material.

I claim:

1. In combination, die means, an injector adapted to engage said die means, thermostatically controlled means for heating plasticizable material within said injector to a predetermined temperature, means for ejecting plasticized material from said injector into said die means at regular intervals in accordance with a predetermined operating cycle, with the temperature at which the material is normally maintained being chosen as best suited for the length of said cycle, and mechanism automatically responsive to any variations in the operating cycle of said injector for determining the temperature to which the plasticized material is actually subjected.

2. In combination, die means, an injector adapted to engage said die means, thermostatically controlled means for heating plasticizable material within said injector to a predetermined temperature, means for ejecting plasticized material from said injector into said die means at regular intervals in accordance with a predetermined operating cycle, with the temperature at which the material is normally maintained being chosen as best suited for the length of said cycle, and mechanism automatically responsive to any increase in the intervals between which plasticized material is injected into said die means for decreasing the temperature to which the plasticized material is actually subjected.

3. In combination, die means, an injector adapted to engage said die means, thermostatically controlled means for heating plasticizable material within said injector to a predetermined temperature, means for ejecting plasticized material from said injector into said die means at regular intervals in accordance with a predetermined operating cycle, with the temperature at which the material is normally maintained being chosen as best suited for the length of said cycle, and electro-responsive means synchronized with the operating cycle of said injector for automatically determining the temperature to which the plasticized material is actually subjected.

4. In combination, die means, an injector adapted to engage said die means, thermostatically controlled means for heating plasticizable material within said injector to a predetermined temperature, means for ejecting plasticized material from said injector into said die means at regular intervals in accordance with a predetermined operating cycle, with the temperature at which the material is normally maintained being chosen as best suited for the length of said cycle, and an electronic discharge device responsive to any variations in the operating cycle of said injector for automatically determining the temperature to which the plasticized material is actually subjected.

5. Heat control apparatus for injection molding machines, comprising in combination, a member provided with thermostatically controlled means for heating plasticizable material therein to a predetermined temperature, means for ejecting plasticized material from said member at regular intervals, with said predetermined temperature of the material being chosen to obtain the desired degree of plasticity and in accordance with the length of intervals between successive ejections of material, and means for additionally controlling the temperature of said member in response to any alteration in the length of said ejection intervals.

6. Heat control apparatus for injection molding machines, comprising in combination, a member provided with thermostatically controlled means for heating plasticizable material therein to a predetermined temperature, means for ejecting plasticized material from said member at regular intervals, with said predetermined temperature of the material being chosen to obtain the desired degree of plasticity and in accordance with the length of intervals between successive ejections of material, and means for automatically reducing the temperature of said member, in response to any increase in the intervals between which plasticized material is ejected therefrom.

7. Heat control apparatus for injection molding machines, comprising in combination, a member provided with thermostatically controlled means for heating plasticizable material therein to a predetermined temperature, means for ejecting plasticized material from said member at regular intervals, with said predetermined temperature of the material being chosen to obtain the desired degree of plasticity, and in accordance with the length of intervals between successive ejections of material, and means supplementing the operation of said thermostatically controlled heating means for additionally controlling the temperature to which the material is subjected, in response to any alteration in the length of the intervals between successive ejections of material from said member.

8. Heat control apparatus for injection molding machines, comprising in combination, a member provided with thermostatically controlled means for heating plasticizable material therein to a predetermined temperature, means for ejecting plasticized material from said member at regular intervals, with said predetermined temperature of the material being chosen to obtain the desired degree of plasticity and in accordance with the length of intervals between successive ejections of material, and means supplementing the operation of said thermostatically controlled heating means for automatically reducing the temperature to which the material is subjected in said member, in response to any increase in the intervals between which plasticized material is ejected therefrom.

GRAYDON SMITH.